United States Patent [19]

Gaus

[11] 4,409,940

[45] Oct. 18, 1983

[54] SPEED GOVERNOR FOR INTERNAL COMBUSTION ENGINES

[75] Inventor: Harry Gaus, Bensheim, Fed. Rep. of Germany

[73] Assignee: Fritz Heinzmann GmbH & Co., Albershausen, Fed. Rep. of Germany

[21] Appl. No.: 221,536

[22] Filed: Dec. 31, 1980

[30] Foreign Application Priority Data

Dec. 31, 1979 [DE] Fed. Rep. of Germany ....... 2952786

[51] Int. Cl.³ .................. F02D 11/10; B60K 31/00
[52] U.S. Cl. ................................... 123/361; 123/337
[58] Field of Search ............... 123/319, 337, 361, 363, 123/367, 403, 462, 357, 399, 352

[56] References Cited

U.S. PATENT DOCUMENTS

| | | | |
|---|---|---|---|
| 1,502,800 | 7/1924 | Replogle | 123/361 |
| 1,786,063 | 12/1930 | Gumpper | 123/337 |
| 2,168,605 | 8/1939 | Messinger, Jr. | 123/361 |
| 2,568,380 | 9/1951 | Bohn | 123/361 |
| 3,392,799 | 7/1968 | Ishikawa | 123/361 |
| 4,211,193 | 7/1980 | Cox et al. | 123/352 |
| 4,278,059 | 7/1981 | Collonia | 123/319 |
| 4,301,883 | 11/1981 | Collonia | 123/352 |
| 4,313,408 | 2/1982 | Collonia | 123/352 |

FOREIGN PATENT DOCUMENTS

| | | | |
|---|---|---|---|
| 186799 | 7/1906 | Fed. Rep. of Germany | 123/361 |
| 2055874 | 5/1972 | Fed. Rep. of Germany | 123/361 |

*Primary Examiner*—Raymond A. Nelli
*Attorney, Agent, or Firm*—Becker & Becker, Inc.

[57] ABSTRACT

A speed governor, for internal combustion engines, with an electromechanical adjustment member for adjusting a butterfly valve or an injection pump, an electronic speed receiver, and an electronic control member. The adjustment member has a stationary part with coils, and a part, with a permanent magnet, rotatably journalled in the stationary part, with the magnetic field of the magnet passing through the coils; the permanent magnet is arranged in such a way that a torque of predetermined magnitude and direction is effective thereon during current flow through the coils. The permanent magnet may be embodied as an at least two-pole, axially magnetized ring with a first laminated-iron ring as a magnetic return, and the adjustment member may be provided with at least two stationary, evenly wound, sector-shaped coils and a second laminated-iron ring as a magnetic return. The permanent magnet may be cylindrical and in two poles, as well as being radially magnetized, with two stationary coils surrounding the permanent magnet in a plane parallel to the rotary axis, and a stationary iron tube being provided as a magnetic return.

10 Claims, 11 Drawing Figures

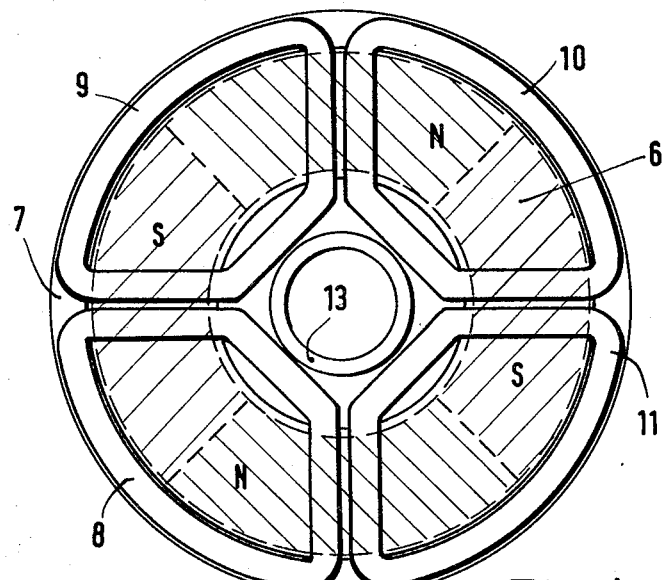
Fig. 4
Fig. 5
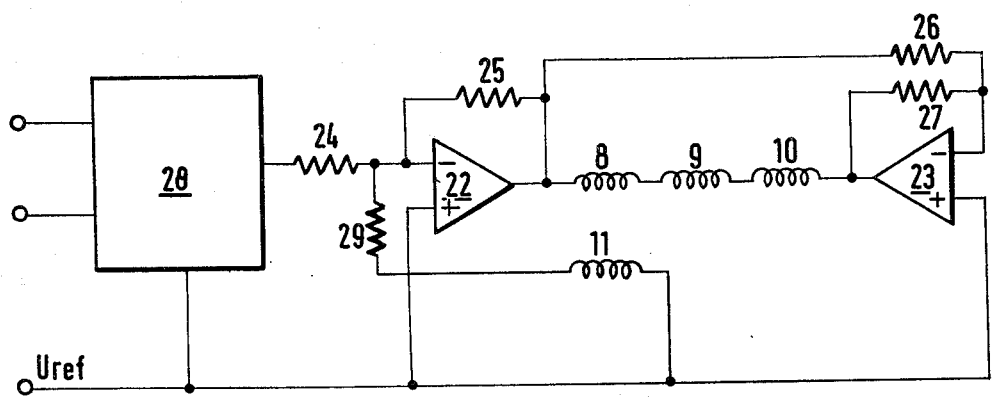

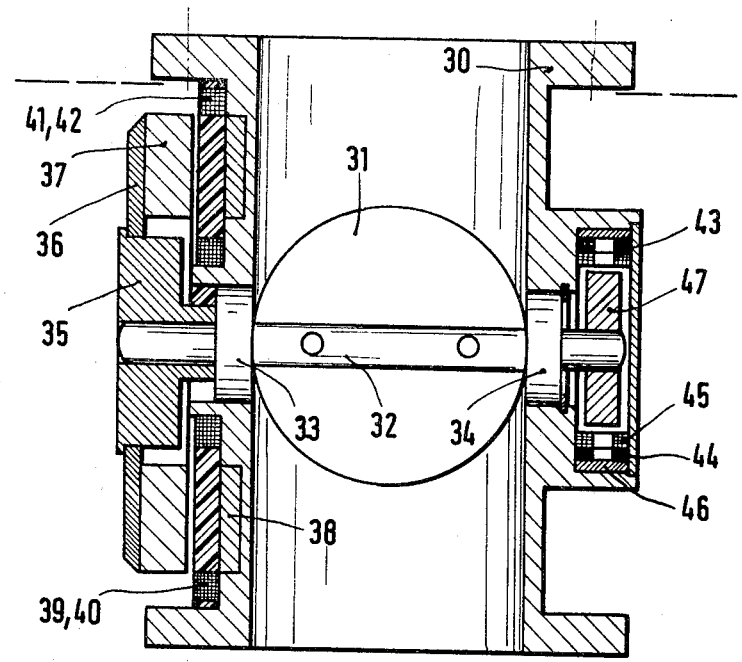
Fig. 6
Fig. 7
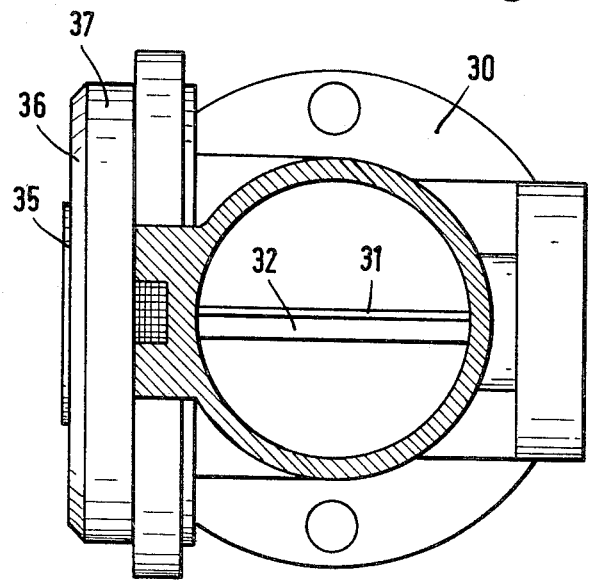

SPEED GOVERNOR FOR INTERNAL COMBUSTION ENGINES

The present invention relates to a speed governor or speed regulating device, for internal combustion engines, with an electromechanical adjustment member for adjusting a throttle or butterfly valve, or an ejection pump, an electronic speed receiver, and an electronic control member. The speed governor serves, independently of load, to keep constant a rated speed which itself can be variable.

The need to regulate or govern the speed of an internal combustion engine arises when the speed for the driven load can be permitted to fluctuate within only narrow limits, for instance during driving of a synchronous generator for current or power generation, for driving a compressor for heat pumps, or for driving a motor-hydraulic fork lift with a stroke speed and travel speed which have to be kept constant.

According to the state of the art, mechanical centrifugal governors or regulators are used in Diesel motors and are installed in the injection pump. Mechanical centrifugal regulators or governors are also customary on Otto motors having throttle or butterfly valve control for the operation thereof with liquid or gaseous fuels; these governors are driven by means of a V-belt from the motor crankshaft, and are effective upon the butterfly valve position.

The mechanical governors have the disadvantage that an optimum regulation or control behavior is not possible with integral portions and differential portions, so that the demands, for instance on current or power supply systems, which are to replace the current or power delivered by a power plant (emergency current or power systems), are not fulfilled. Also, an operation as a follower regulator, or a parallel operation of such power supply replacement systems, is not possible, or is possible only with difficulty.

A different group of governors or regulators operates with electronic means from the speed receiver to the input of the regulator adjustment member. The conversion of the electrical adjustment magnitude into a mechanical adjustment force can occur directly electromechanically, or indirectly with electro-hydraulic or electro-pneumatic means.

The control characteristics are determined extensively by the adjustment member, since here the damaging influences of response delay arise by way of mass inertia as well as nonlinearity and frictional hysteresis.

Indirectly operating adjustment members utilizing the pressure of the working medium can bring about suitable adjustment forces, but they are costly and more likely to be disadvantageous from a control technique standpoint.

So-called solenoids or lifting magnets are used as directly effective adjustment members and comprise a cylindrical copper coil with a soft iron mantle and soft iron end discs, into which a soft iron core or armature can be magnetically drawn. Rotational movements of a butterfly valve are generated in this connection by means of a lever deflection or reorientation.

This apparatus has a series of disadvantages from a control technical standpoint:

The adjustment member is basically unsymmetrical, since only attracting forces can be generated, and non-linear, since the force is proportional to the square of the current. The force is furthermore dependent upon the position of the iron core or armature, and can only be made position independent in a small lift or shift range.

For the purpose of making the adjustment member nearly linear and symmetrical, the adjustment member must cooperate with a suitable counterspring. To attain position independence, the spring and magnetic characteristics must be matched or adapted exactly to each other. Also, an electrical correction by a position return with a potentiometer is known.

The cooperation with a spring worsens the electrical efficiency by approximately half, so that the possible accelerations of the relatively heavy iron core or armature are still smaller, and the response time is even longer.

Problems from a regulation or control technical standpoint result therefrom that the coil current generates a definite or applied acceleration, the rotational position of the butterfly valve accordingly existing with 180° phase delay because of the double integration. The governor or regulator is accordingly basically unstable, and can only be stabilized by phase-correcting measures, such as by introducing a differential portion or by linear movement damping with viscous media. The conversion of a linear into a rotating movement brings about geometric distortions if the adjustment angles are large, and can introduce additional inaccuracies into the system. A position return by means of a potentiometer is acceptable from a technical cost standpoint, but results in sensitivity to wear and vibration.

While the electronic part of the regulator or governor according to the state of the art extensively fulfills the requirements made of the control or regulation, the conversion of the electrical energy into mechanical energy is burdened with shortcomings.

The object of the present invention is to embody the adjustment member for the adjustment of butterfly valves or injection pumps in such a way that the indicated disadvantages are eliminated.

This object, and other objects and advantages of the present invention, will appear more clearly from the following specification in connection with the accompanying drawings, in which:

FIG. 4 is a schematic illustration of the coil arrangement and the field distribution of the permanent magnet ring of the rotary adjustment member of FIGS. 1 and 2.

FIG. 5 is an electrical basic circuit diagram of the governor or regulator;

FIG. 6 shows an adjusting device for a throttle or butterfly valve with adjustment member, butterly valve, and rotary positioning receiver on a common shaft in a common housing;

FIGS. 7 and 8 illustrate different views of the butterfly valve adjusting device according to FIG. 6;

The speed governor of the present invention is characterized primarily in that the adjustment member is provided with a stationary part with coils, and with a part which is rotatably journalled in the stationary part and has a permanent magnet, the magnetic field of which passes through the coils; the permanent magnet is arranged in such a way that a torque of predetermined magnitude and direction is effective thereon upon current flow through the coils.

According to the present invention, the adjustment member for the rotating adjustment of butterfly valves or injection pumps may comprise an at least dual-pole, axially magnetized permanent magnet ring with a first iron plate or laminated-iron ring as a magnetic return, both of which are rotatably journalled about the figure axis, and at least two stationary, evenly wound, sector-shaped coils with a second iron plate or laminated-iron ring as a magnetic return.

Another solution of the object according to the present invention is characterized by a two-pole, radially magnetized cylindrical magnet, or an identical construction of magnet pieces and pole pieces, which is rotatably journalled, two stationary coils surrounding the magnet in a plane parallel to the rotational axis, and a stationary iron pipe or tube as a magnetic return.

According to a further solution of the object of the present invention, a throttle or butterfly valve may be provided which comprises a non-magnetic frame with two magnetic plates magnetized at right angles to the surface thereof, and is rotatably journalled in a housing about which a coil is coaxially wound; a further coil is installed or arranged parallel to the rotary axis of the butterfly valve and to the housing axis.

The permanent magnet ring with the first laminated-iron ring may be fastened directly on the butterfly valve shaft, and the coils with the second laminated-iron ring may be fastened directly on the butterfly valve housing.

A rotary positioning receiver may be arranged on that side of the journalling or support facing away from the permanent magnet. The rotary positioning receiver may be constructed according to the principle of a differential transformer.

At least one of the coils may be connected to the output of an amplifier, and at least another of the coils may be connected to the input of the same amplifier.

Figure 1:
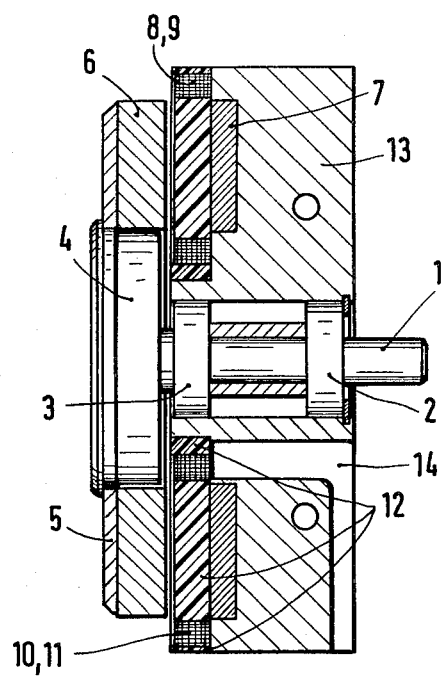
FIG. 1 shows a rotary adjustment member for adjusting a throttle or butterfly valve.

Referring now to the drawings in detail, FIG. 1 shows a sample embodiment for an inventive adjustment member for throttle or butterfly valves. A hub 4 is located on a shaft 1 which is journalled in two bearings 2 and 3. This hub 4 serves as a support or carrier for a first laminated-iron or iron plate ring 5, and for a permanent magnet ring 6. The magnet ring 6 is axially magnetized in such a way as to have four poles (see FIG. 4). The flux lines extend in a direction toward a stationary second laminated-iron or iron plate ring 7, in which connection they pass through four flat sector-shaped coils 8, 9, 10, 11. The designation "iron plate" or "laminated-iron" is to express that the magnetic characteristics of the material are emphasized, such as high saturation flux density and small coercivity. Mechanical characteristics are less important.

Figure 2:
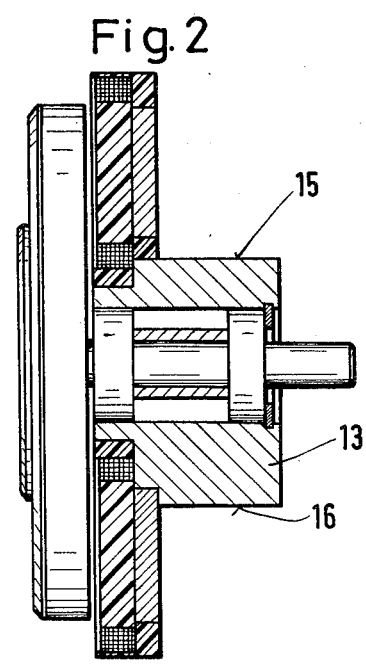
FIG. 2 shows the rotary adjustment member of FIG. 1, though rotated by 90° around the axis of the figure.
Figure 3:
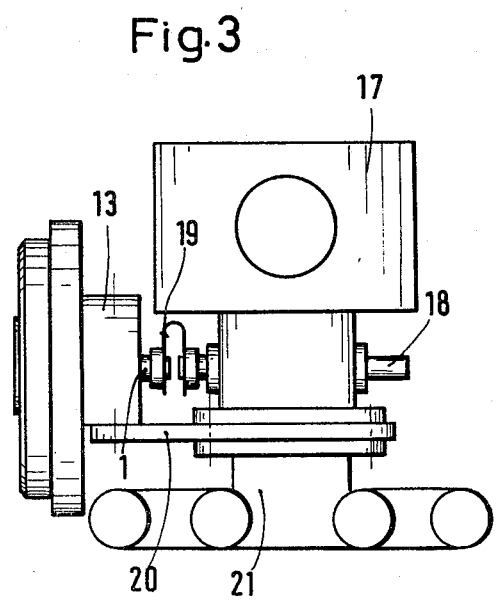
FIG. 3 is a schematic illustration of the arrangement of the governor or regulator in a natural gas unit.

The mentioned coils are connected into a rigid body with casting resin 12, such as, for example, epoxy resins, and are embedded in a support body 13. The coil connections are guided out through a passage 14. FIG. 2 shows the same adjustment member turned by 90°. The support body 13 has a beam shape with two contact or support surfaces 15 and 16 which are located at two predetermined distances from the axis of the shaft 1 in order to achieve the axial alignment for two carburetor sizes. FIG. 3, not drawn to scale, shows the assembly with a natural gas unit 17 with a throttle or butterfly valve shaft 18, a partially elastic coupling 19, an intermediate plate 20, and an intake elbow 21. Because of this simple assembly, there exists no vibration sensitivity and no additional friction or risk of binding.

The operation of the rotary adjustment member is apparent from FIG. 4. The coils 8, 9, 10 can be electrically connected in series with reversed winding sense or direction of the middle coil 9. A current generates torque in the four-pole permanent magnet ring 6, with such torque being additive in the same direction. The torque is directly proportional to the current in magnitude and direction. Since no additional forces are required by way of springs and the like, the governor or regulator is isotropic, i.e., the characteristics thereof are independent of the rotary position, and thus also of the motor load. On this basis, the load dependence of the speed is completely eliminated without further measures, whereby a sufficient, aerodynamic balance or equalization of the butterfly valve is preconditioned. Upon utilization of a good magnetic material, the ratio of torque to inertia moment is very advantageous, so that the adjustment range can pass through for instance 74° in approximately 50 milliseconds. Suitable magnetic materials are wet-pressed strontium ferrites and magnets with rare earth metals.

The particular utilization of the coil 11 results in a meaningful improvement of the control condition or behavior. While the three coils 8, 9, 10 generate a torque and hence a rotary movement, a voltage directly proportional to the rotary speed is induced in the coil 11, and this voltage is applied to the input of an amplifier. An applied speed results with an electrical phase position of only −90°, so that the governor or regulator remains stable.

The possible rotary angle in this four-pole embodiment is limited to 90° which, however, is sufficient since butterfly valves are always arranged for rotary angles between 60° and 74°. In a two-pole embodiment, the theoretical rotary angle is 180°. Of the two remaining coils, only one is usable for driving, so that with the remaining measurements or values remaining identical, the torque goes back to $\frac{1}{3}$ of the four-pole embodiment. In a six-pole embodiment, the rotary angle amounts to a maximum of 60°, and the torque can rise to 5/3 of that of the four-pole embodiment.

FIG. 5 shows an electrical wiring diagram. The coils 8, 9 and 10 are located in the output of two amplifiers 22 and 23 arranged in a bridge circuit. Resistors 24, 25, 26, 27 result in the bridge characteristic, i.e. the opposing relationship of the partial or component output voltages. Corresponding to the position of rated speed (Soll) and reference voltage (Uref), and the time relationship of the actual speed (Ist), by way of the resistor 24, an electronic control or regulator 28 delivers a control current to the amplifier 22, and a current to the series circuit comprising resistor 29 and coil 11. The accelerating torque disappears as soon as the voltage in the coil 11, which voltage is proportional to the rotary speed, accurately compensates the control current.

Conversely, each rotation engaging externally encounters a torque proportional to the rotary speed, so that a linear damping results which is suitably adjustable by the relationship of the resistors 24 and 29. Both of these characteristics of the adjustment member, namely a definite or applied adjustment speed and a linear damping, have the greatest value for an advantageous transient behavior of the entire control system.

An advantageous embodiment of a throttle or butterfly valve adjusting device is illustrated in FIG. 6. A throttle or butterfly valve 31 is located on a shaft 32 in a housing 30, and the shaft 32 is journalled in two bearings 33 and 34. The rotary adjustment member is installed on one end of the shaft, and comprises a hub portion 35 with an iron plate or laminated-iron ring 36, and a permanent magnet ring 37. A second iron plate or laminated-iron ring 38, and four coils 39, 40, 41, 42, are located in a recess or formation of the housing 30. A rotary positioning receiver is located upon the other end of the shaft and is required, for instance, for parallel operation of several motors. The rotary positioning receiver can be embodied in a known manner as a differential transformer with two primary coils 43, 44, a secondary coil 45, a yoke 46, and a core 47 which is rotatable with the shaft 32.

Figure 8:
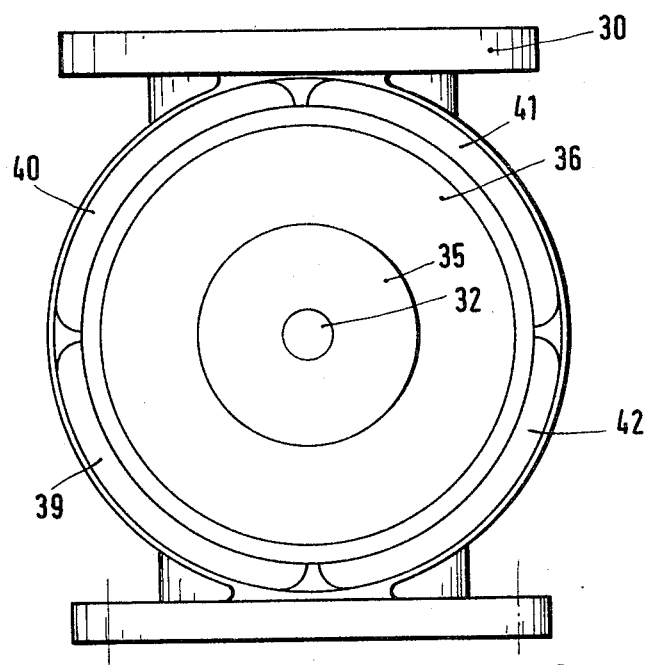

FIGS. 7 and 8 show the same butterfly valve adjuster in different views. With this embodiment, there are no parts which are susceptible to wear or which would bring about inaccuracies, friction, or elasticity in the control region.

Figure 9:
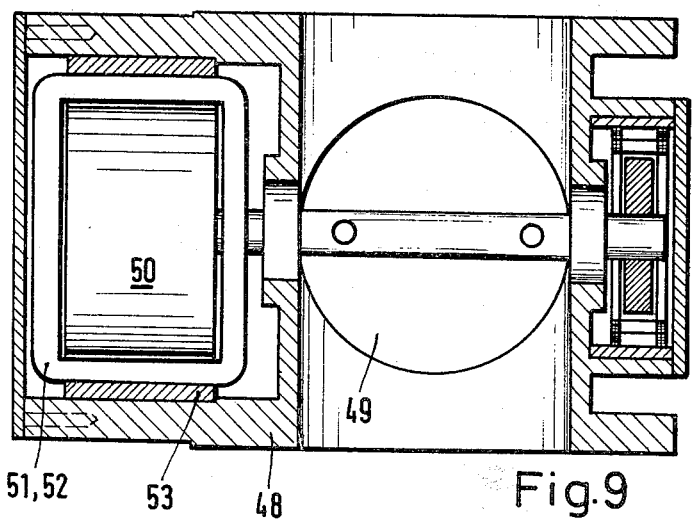
FIG. 9 shows a modified embodiment of the adjusting device of FIG. 6 in a cylinder-symmetrical field geometry.

An even better relationship of torque to inertia moment is attainable with the arrangement illustrated in FIG. 9, which is physically identical with the arrangement according to FIGS. 6 through 8, yet differs in construction by way of a cylindrical field geometry. A two-pole, radially magnetized rotor 50 is located in the housing 48 and is rotatably journalled together with a throttle or butterfly valve 49. The rotor 50 is surrounded by two stationary coils 51 and 52 which in turn are fixed to an iron pipe or tube 53. A rotary positioning receiver corresponding to the illustration of FIG. 6 is located upon the opposite shaft end.

Figure 10:
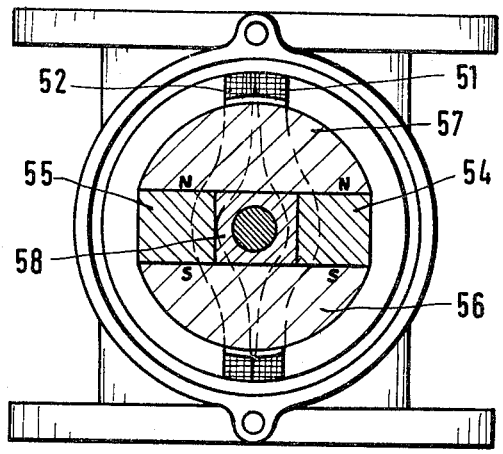
FIG. 10 shows the butterfly valve adjusting device of FIG. 9 in a different view.

FIG. 10 shows a rotor construction comprising two permanent magnets 54 and 55, which preferably comprise rare earth material, two pole pieces 56 and 57, and a non-magnetic shaft receiving means 58. The adjustment time for an angle of 74° can be shortened to approximately 30 milliseconds with this butterfly valve adjuster.

Figure 11:
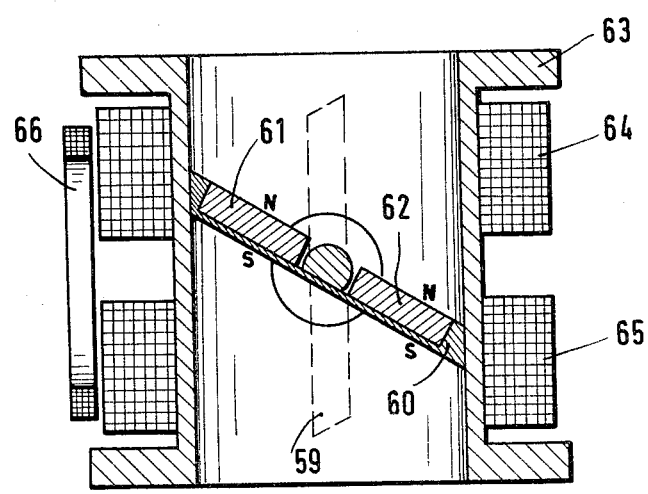
FIG. 11 shows a further embodiment of a butterfly valve adjusting device with a magnetic, directly driven, butterfly valve.

FIG. 11 shows an especially simple butterfly valve adjuster. The butterfly valve 59 comprises a non-magnetic frame 60 and two magnetic plates 61 and 62 which are magnetized at right angles to their surface. Two coils 64 and 65 are wound around a housing 63. A current through these coils 64 and 65 generates a torque upon the butterfly valve 59 which is proportional to the direction and magnitude of the current. If the magnetic plates are made of a good rare earth material, very high adjustment moments, or for instance 0.2 Nm, can be generated which, because of the small mass, lead to short adjustment times. For this reason, this rotary adjustment member is especially suitable for emergency turning-off or stopping.

A linear damping can be attained by means of a coil 66 in which voltages are induced which are proportional to the rotary speed. To avoid reaction by the driving current in the coils 64 and 65, the coil is arranged at right angles to the coils 64 and 65.

All described adjustment members have the following advantages in common:

Reversing or diverting mechanical transfer members are eliminated, since the desired rotary movement is generated directly.

The electromechanical conversion is current linear and symmetrical in sense of indication (+or −). The adjusters are isotropic. There exists a strictly linear damping without utilization of viscous or friction means. A definite or applied adjustment speed with a control-technical frequency characteristic of −6 db/octave is provided. Theoretical currentless relationship exists in the transient or oscillation condition since continuous auxiliary forces by way of springs and the like are not required. A very small dead range exists since the binding friction is very small because of the exclusively rotating movement or light weight of the active parts.

The present invention is, of course, in no way restricted to the specific disclosure of the specification and drawings, but also encompasses any modifications within the scope of the appended claims.

What I claim is:

1. In a speed governor, for internal combustion engines, including an automatic control system and a fuel dosage system therewith, the improvement in combination therewith comprising an electromechanical adjustment member that actuates the fuel dosage system and having a stationary part with at least two evenly wound sector-shaped stationary coils, and a movable part with a permanent magnet which is an at least dual-pole, axially magnetized ring having an axis of rotation and rotatably journalled in said stationary part, the magnetic field of said permanent magnet passing through said coils having winding axes located substantially parallel to the axis of rotation of said permanent magnet ring, said permanent magnet being arranged in such a way that a torque of predetermined magnitude and direction is effective thereon when current flows through said coils which are located stationary around the axis of rotation axially opposite said permanent magnet ring and an electrical adjustment control magnitude accordingly is supplied to said coils so that the electromechanical adjustment member converts electrical input magnitude into a mechanical output magnitude, whereby the torque is exactly proportional to the current according to the magnitude and direction thereof, said electromechanical adjustment member being actuated by electrical adjustment magnitude of the automatic control system, whereby an actual value corresponding to the instantaneous speed and a rated value corresponding to rated speed are supplied to the automatic control system and the electrical adjustment magnitude is produced dependent upon difference of these values.

2. In a speed governor in combination according to claim 1, in which said permanent magnet ring includes a first laminated-iron ring as a magneticreturn, and a second laminated-iron ring as a magnetic return.

3. In a speed governor in combination according to claim 2, which includes a butterfly valve including butterfly valve housing and a butterfly valve shaft, said permanent magnet ring with said first laminated-iron ring being fastened directly on said butterfly valve shaft, and said coils with said second laminated-iron ring being fastened directly on said butterfly valve housing.

4. In a speed governor in combination according to claim 1, in which said permanent magnet is cylindrical, dual-poled, and radially magnetized; which includes two stationary coils which surround said permanent magnet in a plane parallel to the rotational axis; and which includes a stationary iron pipe connected to said coils and serving as a magnetic return.

5. In a speed governor in combination according to claim 1, which includes: a housing about which at least one coil is coaxially wound; a butterfly valve comprising a non-magnetic frame and two magnetic plates which are magnetized at right angles to their surface and are rotatably journalled in said housing; and a further coil arranged parallel to the rotary axis of said butterfly valve and to the axis of said housing.

6. In a speed governor in combination to claim 1, which includes a rotary positioning receiver arranged on that side of said stationary part facing away from said permanent magnet.

7. In a speed governor in combination according to claim 6, in which said rotary positioning receiver is patterned after the principle of a differential transformer.

8. In a speed governor in combination according to claim 1, which includes an amplifier, at least one of said coils being connected to the output of said amplifier, and at least another of said coils being connected to the input of said amplifier.

9. In a speed governor in combination according to claim 2, which includes a casting resin connection of said coils into a rigid body.

10. In a speed governor in combination according to claim 9, which includes a four-pole permanent magnetic ring and four sector-shaped coils arranged around the axis of rotation.

* * * * *